US011828376B2

(12) United States Patent
Schlueter et al.

(10) Patent No.: US 11,828,376 B2
(45) Date of Patent: Nov. 28, 2023

(54) HIGH STABILITY REGULATOR

(71) Applicant: The Oilgear Company, Traverse City, MI (US)

(72) Inventors: Jared Schlueter, Interlochen, MI (US); Dan Mizell, Traverse City, MI (US)

(73) Assignee: The Oilgear Company, Traverse City, MI (US)

( * ) Notice: Subject to any disclaimer, the term of this patent is extended or adjusted under 35 U.S.C. 154(b) by 0 days.

(21) Appl. No.: 17/574,141

(22) Filed: Jan. 12, 2022

(65) Prior Publication Data

US 2022/0243832 A1  Aug. 4, 2022

Related U.S. Application Data

(60) Provisional application No. 63/136,532, filed on Jan. 12, 2021.

(51) Int. Cl.
*F16K 17/04* (2006.01)
*F16K 17/06* (2006.01)

(52) U.S. Cl.
CPC ........ *F16K 17/0486* (2013.01); *F16K 17/065* (2013.01); *Y10T 137/2607* (2015.04)

(58) Field of Classification Search
CPC ......... Y10T 137/2607; Y10T 137/2637; Y10T 137/783; Y10T 137/2612; G05D 16/101
See application file for complete search history.

(56) References Cited

U.S. PATENT DOCUMENTS

| 393,021 | A | * | 11/1888 | McLaren | G05D 16/109 137/505.47 |
|---|---|---|---|---|---|
| 1,888,866 | A | * | 11/1932 | Russel | G05D 16/0619 137/115.15 |
| 1,925,610 | A | | 9/1933 | Shinn | |
| 3,088,486 | A | * | 5/1963 | Salmon | G05D 16/0402 137/636.1 |
| 3,174,500 | A | * | 3/1965 | Johnson | F15B 1/027 251/297 |
| 3,662,783 | A | | 5/1972 | Stacey | |
| 4,410,000 | A | * | 10/1983 | Mattmann | B60C 23/02 137/115.14 |
| 10,570,818 | B2 | | 2/2020 | Melde-Tuczai et al. | |
| 2012/0234396 | A1 | | 9/2012 | Bell | |
| 2018/0346128 | A1 | | 12/2018 | Kozlowski et al. | |

FOREIGN PATENT DOCUMENTS

| WO | 2019213683 A1 | 11/2019 |
|---|---|---|
| WO | PCT/US22/12160 | 4/2022 |

* cited by examiner

*Primary Examiner* — Robert K Arundale
(74) *Attorney, Agent, or Firm* — David G. Woodral; GableGotwals (57) ABSTRACT

A vent valve opens to provide a fluid path from a regulated pressure port to a vent port, a supply valve opens to provide a fluid path from the regulated pressure port to a supply pressure port. A control piston has a linear cam profile with a vent cam that opens the vent valve and a supply cam that opens the supply pressure valve.

18 Claims, 7 Drawing Sheets

HIGH STABILITY REGULATOR

CROSS-REFERENCE TO RELATED CASES

This application claims the benefit of U.S. provisional patent application Ser. No. 63/136,532, filed on Jan. 12, 2021, and incorporates such provisional application by reference into this disclosure as if fully set out at this point.

FIELD OF THE INVENTION

This disclosure relates to hydraulic circuits in general and, more specifically, to hydraulic pressure regulators.

BACKGROUND OF THE INVENTION

The hydraulic pressure regulator is a widely used piece of equipment in the fluid power industry. A primary function is to reduce a supply pressure to an equal or lower pressure that is more suitable for the equipment to which it supplies fluid. Another function of a regulator is to provide a relieving function to protect the system against excessive pressure in the regulated port. This is particularly useful in circuits that are static for long periods of time.

What is needed is a device that achieves the foregoing, and other aims, while delivering accurate regulated pressure while dealing with pressure spikes, other regulators in the circuit, high and low flow events, and other challenges.

SUMMARY OF THE INVENTION

The invention of the present disclosure, in one aspect thereof, comprises a hydraulic regulator having a vent valve that opens to provide a fluid path from a regulated pressure port to a vent port, a supply valve that opens to provide a fluid path from the regulated pressure port to a supply pressure port, and a control piston having a linear cam profile with a vent cam that opens the vent valve and a supply cam that opens the supply pressure valve. The vent cam and the supply cam are spaced apart axially along the control piston and the vent valve and the supply pressure valve are spaced apart from one another such that only one of the vent valve and the supply valve are opened at once.

The control piston may move in a first direction to open the vent valve and in a second, opposite direction to open the supply valve. The control piston may be exposed on a first end thereof to the regulated pressure port such that the piston moves in the first direction when a regulated pressure exceeds a predetermined limit. The control piston is exposed on a second, opposite end thereof, to a set spring. The control piston may move in the second direction when the regulated pressure on the first end exceeds a force of the set spring on the second end of the piston.

In some embodiments, the control piston is exposed on a second, opposite end thereof, to a hydraulic pilot pressure. The control piston may move in the second direction when the regulated pressure on the first end exceeds a force of the pilot pressure on the second end of the piston. A fluid pathway between the control piston and the pilot pressure may be damped by a check valve with an orifice.

In further embodiments, the control piston is exposed on a second, opposite end thereof to a spring and a hydraulic pilot pressure. The control piston may move in the second direction when the regulated pressure on the first end exceeds a force of the pilot pressure and a force of the spring on the second end of the piston.

The invention of the present disclosure, in another aspect thereof, comprises a hydraulic regulator having a pilot piston with an outer cam profile including a vent lobe at a first end of the cam profile and a first supply lobe on a distal second end of the cam profile, the vent lobe and the first supply lobe extending radially away from a flat medial portion of the cam profile. The regulator has a first ball actuating a vent valve upon contact with the vent lobe, and a second ball actuating a first supply valve upon contact with the first supply lobe. The piston is biased to respond to a regulated pressure at a regulated port by moving axially first direction to bring the first ball in contact with the vent lobe when the regulated pressure exceeds a setpoint, and to respond to the regulated port pressure by moving axially in a second direction to bring the second ball in contact with the first supply lobe when the regulated pressure falls below the setpoint. Opening of the vent valve exposes the regulated port to vent, and opening of the first supply valve exposes the regulated port to a supply pressure. The outer cam profile is configured such that the vent valve and the first supply valve cannot open simultaneously.

In some embodiments, the vent lobe and the first supply lobe are offset from one another circumferentially on the outer cam profile. Some embodiments comprise a third ball actuating second supply valve upon contact with second supply lobe on the control piston. The second supply lobe may be on the second distal end of the cam profile. The first and second supply lobes may be offset circumferentially about 180 degrees from one another on the cam profile.

In some cases, the control piston is biased hydraulically. The regulator may also have a guide with an internal channel and fitted inside the outer cam profile, the internal channel providing the hydraulic bias of the control piston. In some cases, a channel passes axially through the control piston and provides the hydraulic bias to the control piston on a first end thereof opposite a second end exposed to the regulated pressure.

The invention of the present disclosure, in another aspect thereof, comprises a hydraulic actuator with a supply port, a vent port, and a regulated port. The regulator has a supply valve biased in a closed position that provides a fluid connection from the supply port to the regulated port when in an open position. It has a vent valve biased in a closed position that provides a fluid connection from the vent port to the regulated port when in an open position. It also has a control piston having a first end and a second end with a linear cam profile between the first end and the second end, the outer cam profile having a narrower medial portion, a vent lobe on a first end, and a supply lobe on a second end. A first end of the control piston receives a biasing force and the second end of the piston is exposed to the regulated port. The control piston moves the vent lobe into contact with the vent valve thereby opening it when a pressure at the regulated port exceeds a set point. The control piston moves the supply lobe into contact with the supply valve thereby opening it when the pressure at the regulated port falls below the set point. The supply valve and the vent valve are spaced with respect to the linear cam profile such that only one of the supply valve and the vent valve can be opened at once, but both the supply valve and the vent valve may be closed simultaneously.

In some embodiments, the control piston is spring biased on the first end thereof and receives a guide in a chamber in the second end thereof, the guide having an internal channel that with a fluid pathway to the regulated port.

DETAILED DESCRIPTION OF THE PREFERRED EMBODIMENTS

With some regulators, over time, supply pressure can slowly leak into and raise the regulated pressure. When the regulated pressure raises high enough, a relief function may be designed to connect the regulated pressure to a vent port and lower the pressure back down to a desired level.

The set point of a hydraulic regulator may be controlled in two ways. The first is to use a spring and adjustment screw assembly to manually change the set point. The other is what's commonly referred to as a pilot regulator. This type uses hydraulic pressure to create the bias force required rather than a spring. This can allow the operator of the system to remotely change the regulator set point if needed.

Figure 1:
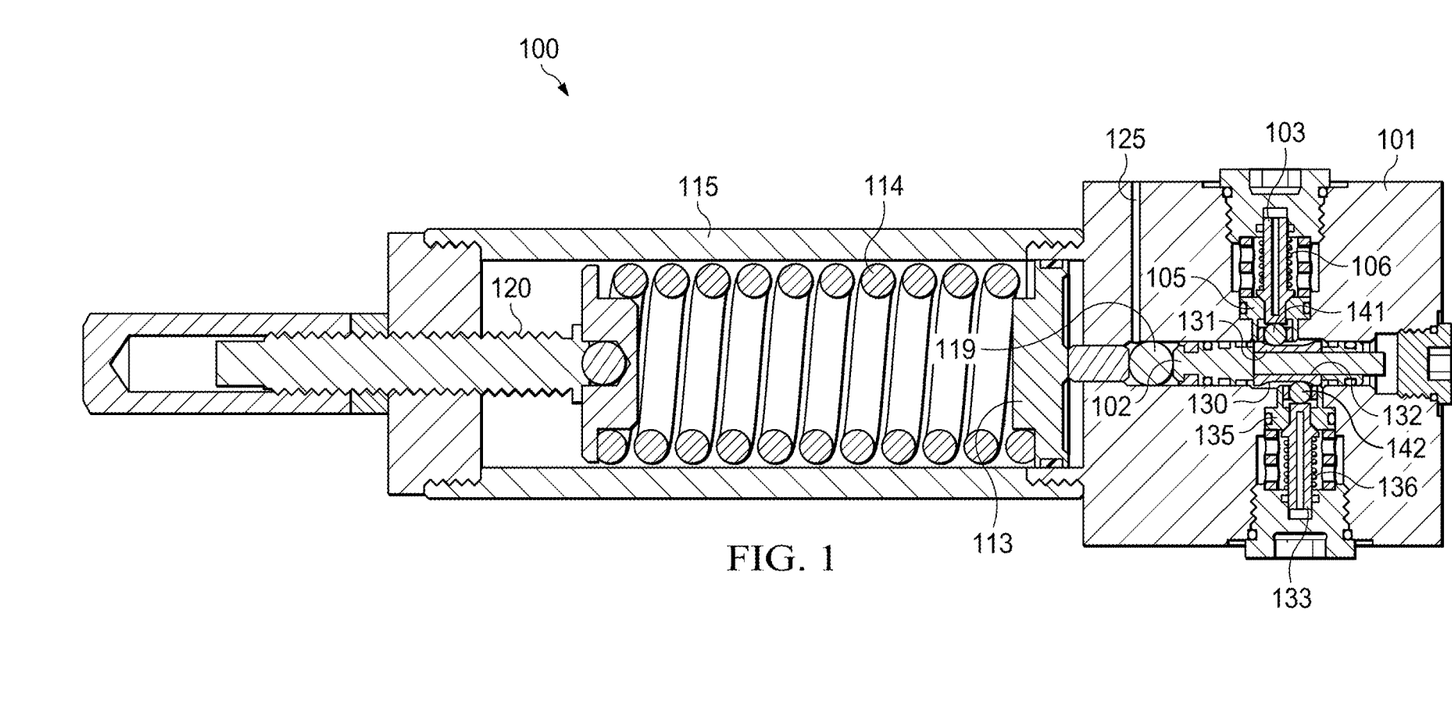
FIG. 1 is a cutaway view of a pilot stage of a high stability regulator according to the present disclosure.

Regulators according to some embodiments of the present disclosure may utilize both a main stage regulating poppet as well as a relieving poppet to accomplish regulating functionality. Some regulators according to the present disclosure also have a pilot stage regulator. FIG. 1 illustrates one such pilot stage regulator 100 in cross section. This pilot stage 100 both regulates and relieves, but allows the overall regulator design (i.e., a main stage) to be more accurate and stable. It also allows the design to have a smaller spring, especially when designed for high pressures.

Figure 2:
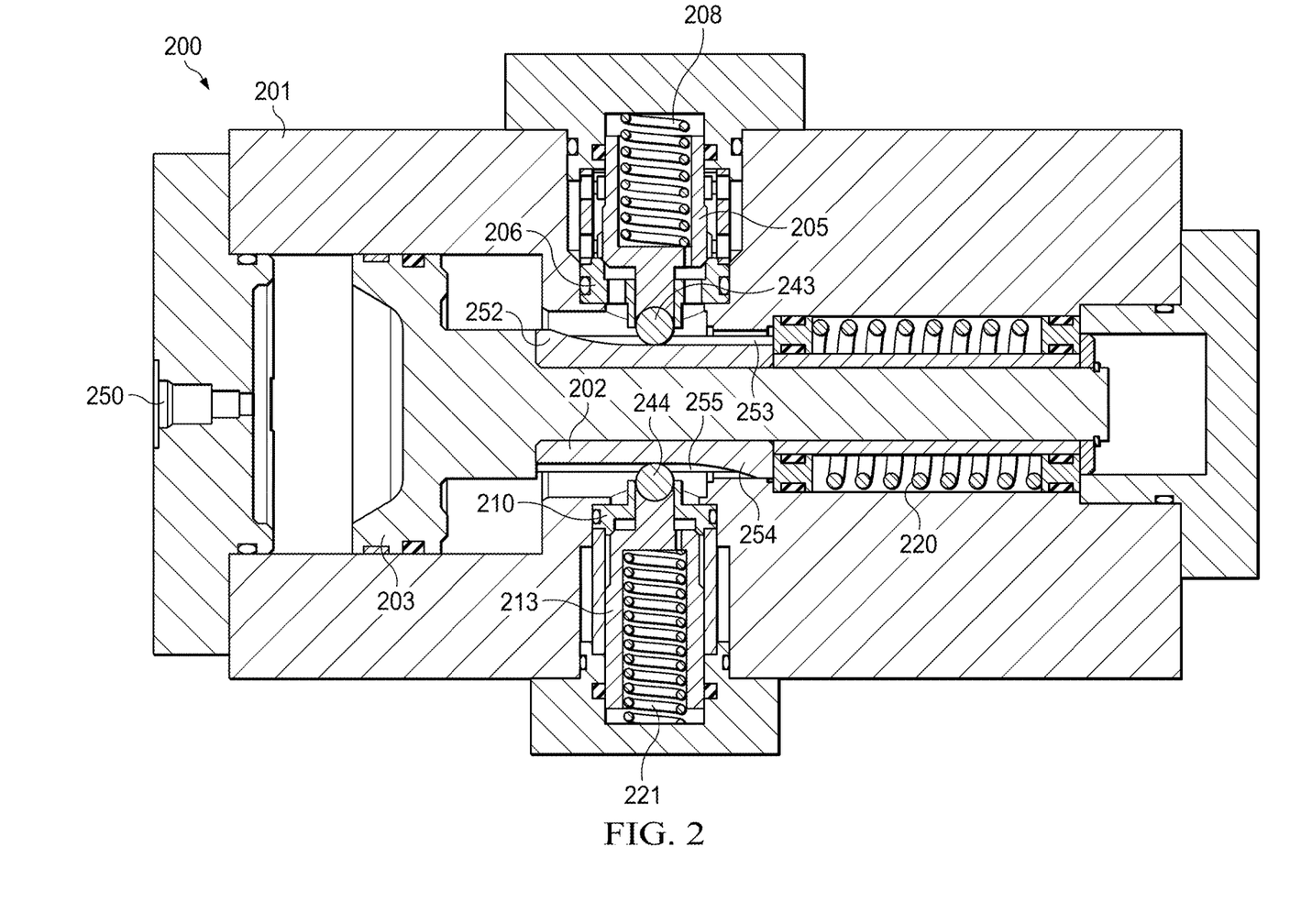
FIG. 2 is a cutaway view of a main stage of a high stability regulator according to the present disclosure.

According to various embodiments, a regulator or regulator system may use the pilot stage 100 to accomplish small flow requirements. When this cannot satisfy demands, the pilot stage 100 may imbalance a main stage regulator (as shown in FIG. 2 and discussed below) to handle higher flow rates.

The pilot stage regulator 100 of FIG. 1 is shown as a manually adjustable regulator. A spring 114 which creates a bias force that can be adjusted to alter the setpoint of the regulator 100. Spring force of the spring 114, and ultimately the regulator set pressure, can be manually changed by using mechanism 120 (which may comprise a screw mechanism) to compress or decompress the spring 114. A housing 115 that contains the spring 114 can be altered, as known in the art, to allow a hydraulic connection to apply pressure to create the bias force on the pilot regulator 100.

As illustrated the pilot regulator 100 comprises a housing 101 to which the spring housing 115 may be affixed. Pressure or bias force from spring 114 may be transferred to a spring seat 113 and onward to bearing 119. A vent port 125 may be provided in the body 101 to prevent the bearing 119 from becoming hydraulically locked or otherwise being unable to move freely in response to forces applied thereto.

Force from bearing 119 creates the bias force controlling the movement of a pilot piston 102. This force is balanced by the regulated pilot pressure in the pilot stage body 101 and bearing against the piston 102 that resists the force applied by the spring 114. A tap into body 101 (out of frame) provides a connection to the regulated pressure side of the piston 102 (on the right, as drawn).

When the regulated pilot pressure falls below the set point, or, in other words, the force that regulated pressure creates on the pilot piston 102 falls below the spring force, the pilot piston 102 will move away from the spring force (to the right, as shown). A ball 104 rides along a contoured slide 130 affixed to other otherwise integrated with the piston 102. The slide 130 may be configured as a tubular member (accommodating the piston 103 inside) but have a varying outer diameter such that the ball 141 may be displaced by an orthogonal displacement of the piston 103. In other embodiments, the slide 130 may be formed as part of the piston 103. As illustrated, the distal ends of the slide 130 comprise wider or inclined ends, or inclined profiles 131, 132 separated by a relatively narrower central portion. However, differencing profiles for the slide 130 could be utilized so long as they are arranged to displace balls and open supply or vent ports according to the function described herein.

In the illustrated embodiment, as the pilot piston 102 moves away from the bearing 119, the ball 141 rides up the inclined profile 131 and pushes a regulator pilot poppet 103, biased closed by spring 106, off an associated seat 105 to open a flow path from a supply source (out of frame, supplying supply pressure to the poppet 103 opposite the ball 104 to the regulated port). By opening the regulated pilot port in this manner, it allows for well controlled throttling of the flow into this port, which drastically reduces the potential for oscillation of the poppet 103.

In some scenarios, supply pressure can leak into the regulated pilot region and slowly raise the pressure. If the pressure in the regulated pilot region increases above the set point, the force applied by the spring 114 is no longer enough to resist the force on the pilot piston 102. The pilot piston 102 then begins to compress the spring 114 and move to the left (toward the bearing 119). As the piston moves, a ball 142 rides up incline 132 (wider portion of slide 130) and begins to open the relieving poppet 133, biased closed by spring 136. As poppet 133 lifts off a seat 135, the regulated pilot pressure is connected to the vent region (on the opposite side of poppet 133 from ball 135) and begins flowing to vent. Regulated pressure will continue flowing to vent as long as there is a force imbalance between the pilot piston 102 and the spring 114.

Once the regulated pressure has dropped enough to balance the forces, the pilot piston 102 moves to the right and the relieving poppet 133 re-seats under pressure from spring 136 onto the seat 135 to stop the flow to vent. It will be appreciated that the operating principal of the relieving function is similar to the regulated pilot function in that it creates a stable and controlled pilot pressure even if there is leakage into the pilot region.

One function of the pilot regulator 100 is to provide a stable pilot pressure for a main stage of regulator for high flow events. FIG. 2 is a cross section of one such main stage regulator 200. It should also be understood that, in some cases, the main stage regulator 200 can be used other pilot sources, or without a separate regulated pilot stage (e.g., by using a spring setpoint).

The main stage regulator 200 may have a control piston 203, operating within a body 201. Pilot pressure from pilot port 250 creates a bias force to the right (away from the port 250). A spring 220 that creates a counter bias force to center the control piston 203. If the force created by the regulated pressure (on the side of piston 203, port out of frame) exceeds the force created by the pilot pressure 250, the control piston 203 will move to the left, or toward the pilot pressure and away from the direction of the spring 220. When the regulated pressure is sufficiently low, the pilot pressure creates enough force to compress spring 220 and move the control piston 203 to the right, toward the spring 220.

The control piston 203 is fitted with a carriage 202. The carriage 202 may be a tubular member though which the piston 203 is fitted. In some embodiments, the carriage 202 may be an integral component with the piston 203. The carriage 203 may have a smaller diameter along a medial portion and a larger diameter on the ends or distal portion. To that end, the distal portions may form ramped inclines 252, 254. To ensure that balls 243, 244 track properly along the carriage 202 for displacement by the ramped inclines 252, 254, slots or tracks 253, 255 may be defined in the carriage 202.

When the control piston 203 moves right, or away from the pilot pressure, the ball 243 is displaced away from the piston 203 by incline 252. The ball 243, on a regulating poppet 205, will begin to push the poppet 205 against spring 208 and off of an associated seat 206 and allow supply pressure to flow to the regulated port (supply port out of frame). As regulated pressure rises, it will begin to resist the force of the pilot pressure and move the control piston 203 back to the left (toward the pilot port). As it moves, the ball 243 follows the contour of the carriage 202 and lowers, allowing the regulating poppet 205 to reseat on the seat 206, and stop flow from supply port to the regulated port.

When there is an event that causes the regulated pressure to rise above the pilot pressure, the control piston 203 becomes imbalanced and moves toward the pilot port 250. As the piston 203 moves, ball 244 follows the contour of the carriage 202 and encounters incline 254 and is displaced away from the piston 203. The ball 244, being in contact with poppet 213, unseats poppet 213 from seat 210 compressing spring 221. This creates a flow path from the regulated pressure port to vent port (out of frame). As the regulated pressure flows out the vent port, the pressure in the regulated region falls. As it falls, the forces on the control piston 203 become balanced with pilot pressure, and the spring 220 re-centers the control piston 203. As the ball 244 follows the contour of the carriage 202, the relieving poppet 213 reseats on the seat 210 and stops the flow of fluid out the vent port.

Figure 3A:
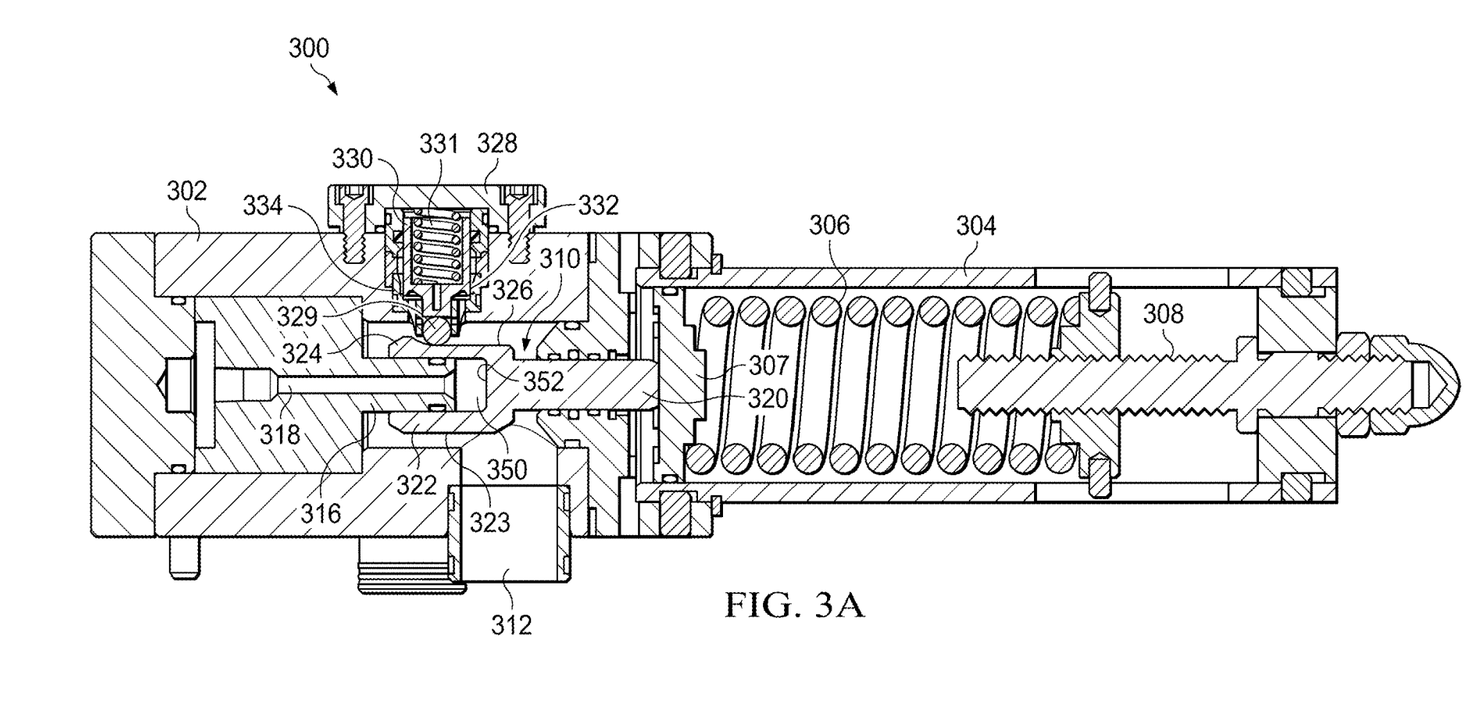
FIG. 3A is a cutaway view of another embodiment of a high stability regulator according to aspects of the preset disclosure.
Figure 3B:
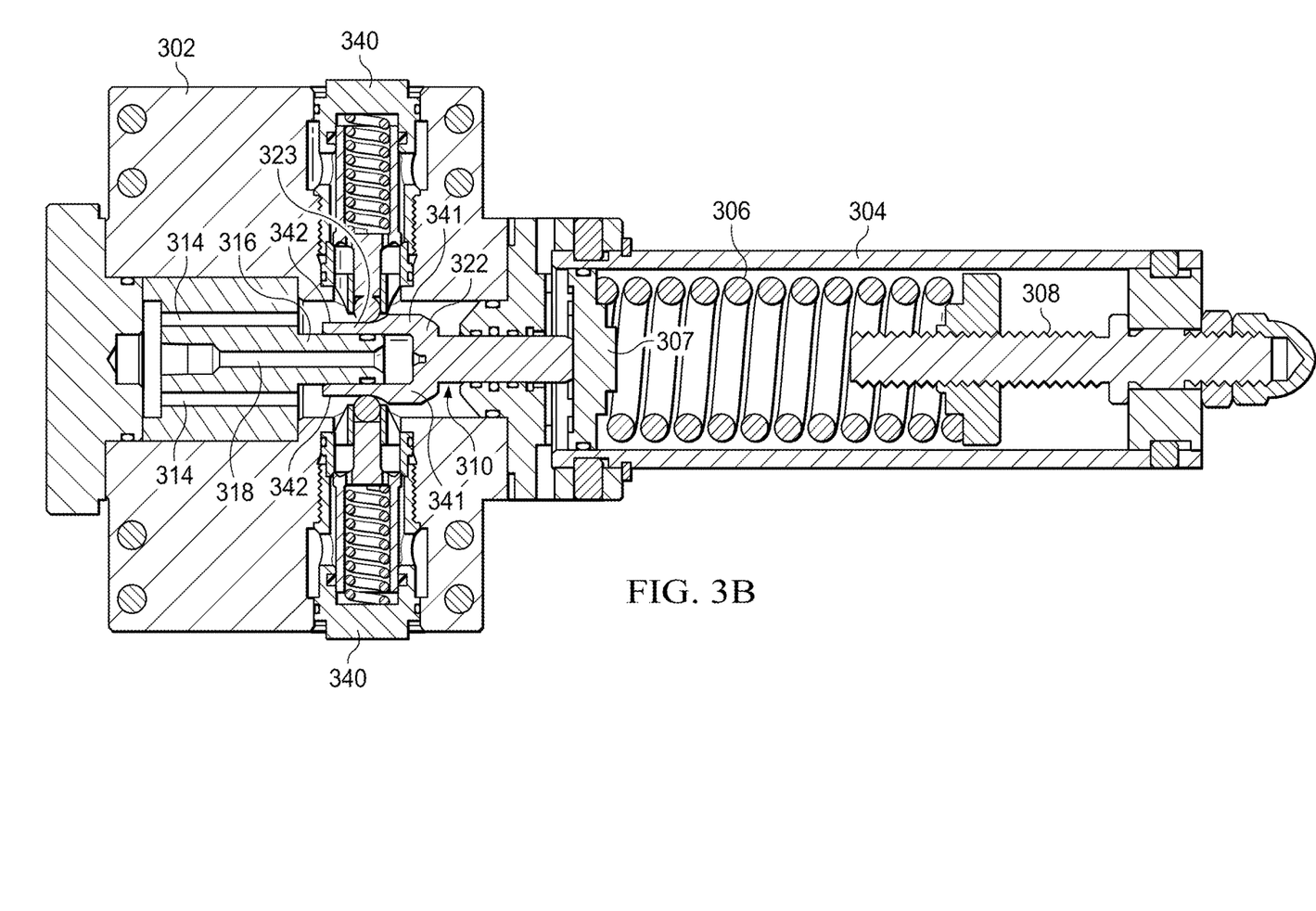
FIG. 3B is another cutaway view of the high stability regulator of FIG. 3A.

Referring now to FIG. 3A a cutaway view of another embodiment of a high stability regulator 300 according to aspects of the preset disclosure is shown. FIG. 3B is another cutaway view of the high stability regulator 300 rotated 90 degrees. The regulator 300 is manually set and comprises a body 302 affixed to a spring housing 304. The body 302 and housing 304 contain most or all of the operational components. Preloading or tension applied to spring 306 within housing 304 may dictate the ultimate regulated pressure provided by the regulator 300. The regulated pressure may be adjusted by spring adjustment mechanism 308, which may comprise a screw type adjustment or other mechanism.

The spring 306 may fit against a spring seat 307 which contacts a control piston 310. The control piston 310 may comprise a stem 320 on a first end, which contacts the spring seat 307, and a cam 322 on an opposite end. The cam 322 may have a profile providing a vent lobe 324 that can slide into contact with a vent valve 328. The vent valve 328 may have a ball 329 that rides on the cam 322 in a slot 326 defined in the cam. The slot 322 may lead into the vent lobe 324 and may or may not be cut into the lobe 324 itself.

The vent valve 328 may be biased in a closed configuration by a spring 331 acting to press a poppet 330 against a seat 334 when the ball 329 is not pressed outward from the cam 322 by the lobe 324 (when the control piston is sufficiently pressed by spring 306 to allow the ball 329 to ride in the slot 326 but not on the lobe 324). The poppet 330 may contact the seat 334 on a peripheral lip 332 that has a profile sufficiently thin to flex slightly against the seat 334. The seat 334 may be steeply angled with respect to the direction of movement of the poppet 330 (e.g., steeper than 45 degrees) such that the lip 332 fits against the seat 334 and seals with relatively little pressure from the spring 331.

The cam 322 may also provide one or more supply lobes 341 and associated slots 342. These may be offset circumferentially from the vent lobe 324 by about 90 degrees on the cam 322 but still aligned with the direction of movement of the control piston 310 to open and close associated supply pressure valves 340. The supply lobes 341 may be located on an opposite end (axially) of the cam 322 from the vent lobe 324. In this manner there are lobes on opposite end of the cam 322 but a medial portion 323 does not open either the exhaust valve or the supply valves 340 with the associated balls of the respective valves occupying the slots 326, 342 but not being displaced such that the valves 328, 340 are open. The supply valves 340 may have a similar construction as the vent valve 328, being spring biased closed, having a lipped poppet, and a steeply angled seat.

The cam 322, in addition to external features, may also have an internal pressure cavity 333 and/or a pressure face 352 that may ensure that the control piston 310 responds adequately to pressure changes in the regulated pressure reaching regulated pressure port 312. In some embodiments, the cavity 333 and/or pressure face are defined within the stem 320. The piston 310 may ride or slide on a guide 316. The guide 316 and/or body 302 may have channels 314 defined therein that lead to a guide channel 318 leading to the pressure cavity 333. In this way the pressure cavity 333 and/or pressure face 352 is in fluid communication with regulated pressure to move the control piston 310.

In operation, if the regulated pressure falls below a setpoint as determined by the adjustment of the spring 306, the control piston 310 will be pushed away by the spring 306 (leftward in the drawings). The supply lobes 341 of the cam 322 will open the supply valves in a linear and controlled fashion exposing regulated pressure and the regulated pressure port 340 to supply pressure (supply port out of frame). This will tend to increase regulated pressure until the control piston returns (rightward in the drawing) to press back against the spring 306 and allowing the supply pressure valves 340 to close.

If the regulated pressure increases beyond a setpoint determined by the adjustment of the spring 306, the control piston will press against and moved toward the spring 306 until the vent lobe 324 opens the vent valve 328, which exposes regulated pressure to vent (vent port out of frame) in a linear and controlled fashion. This will lower the regulated pressure until the force of the spring 306 returns the control piston 310 away from the direction of the spring (leftward as drawn) and allows the vent valve 328 to close.

Figure 4A:
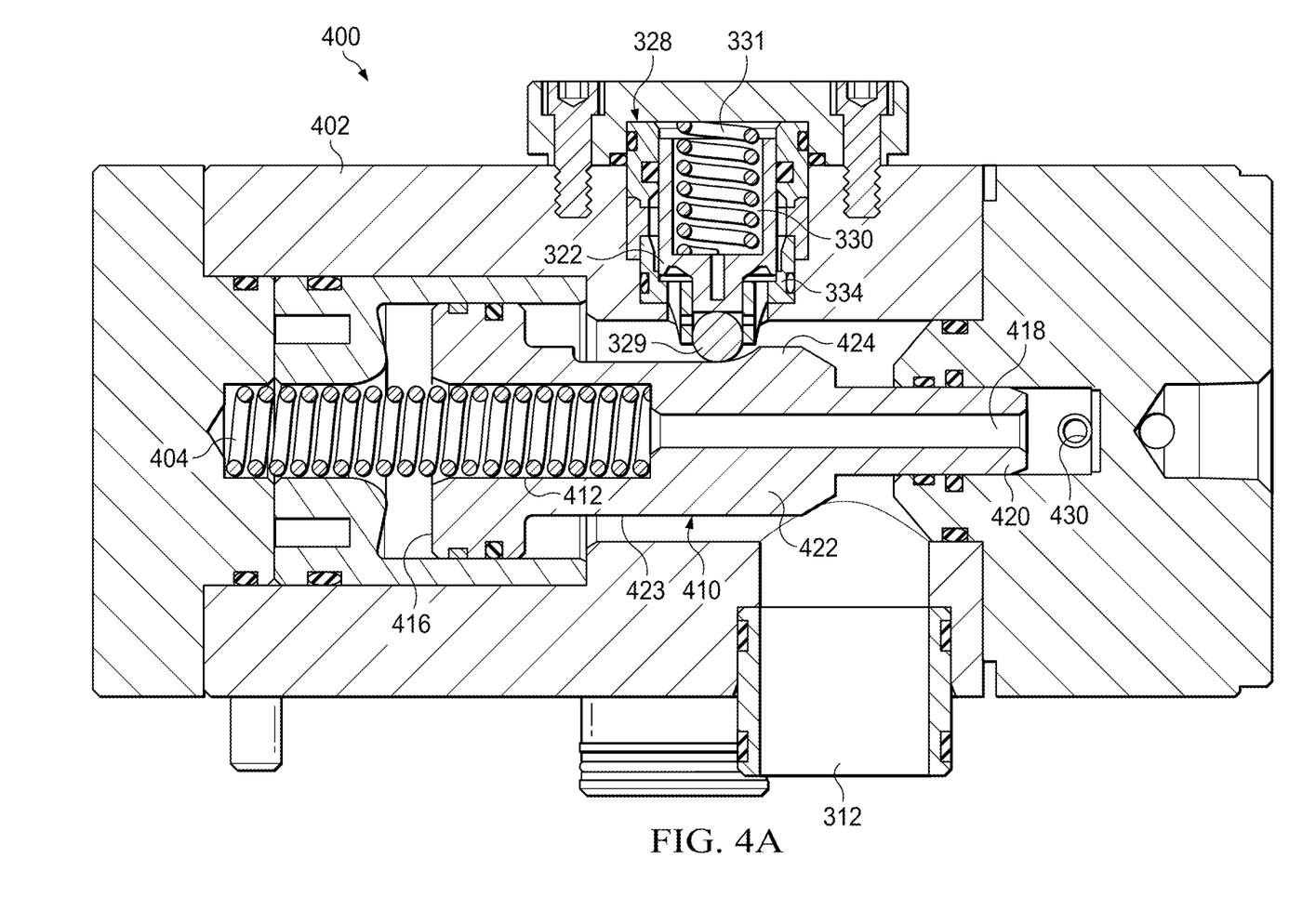
FIG. 4A is a cutaway view of another embodiment of a high stability regulator according to aspects of the present disclosure.
Figure 4B:
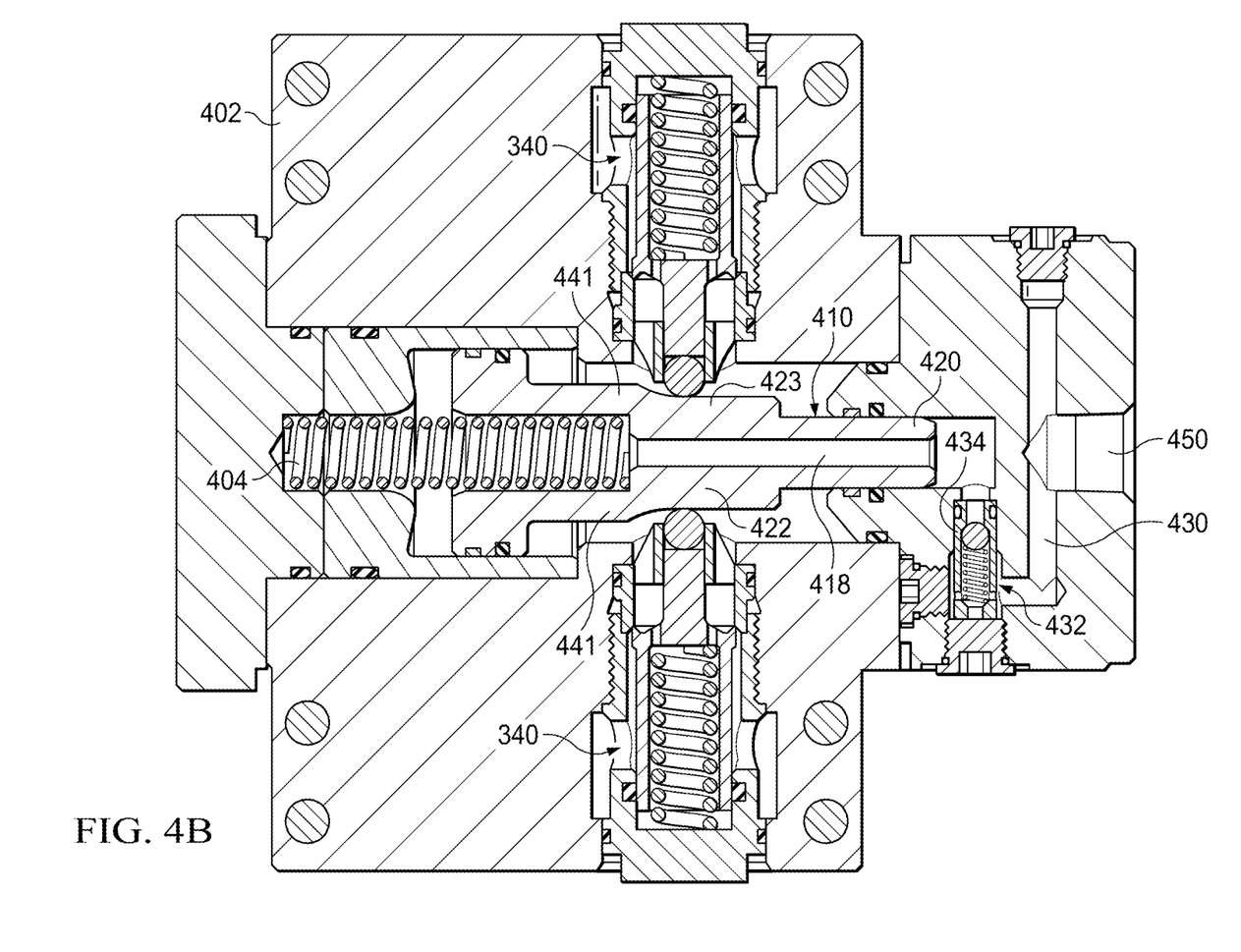
FIG. 4B is another cutaway view of the high stability regulator of FIG. 4A.

Referring now to FIG. 4A, a cutaway view of another embodiment of a high stability regulator 400 according to aspects of the present disclosure is shown. FIG. 4B a cutaway view of the high stability regulator 400 rotated about 90 degrees. The regulator 400 may be hydraulically controlled as to setup or regulated pressure output. To that end, a pilot port 450 is provided in a body 402 of the regulator which feeds into internal passage 430 for operation upon a control piston 410.

The control piston 410 may comprise a stem 420 having an internal passage 418 that allows for fluid communication to a pilot pressure face 416 on an opposite end of the piston 410. A spring 404 may be received by a seat 412 of the piston 410 and provide for gross control over a setpoint of the valve 400.

The piston 410 has a cam portion 422 adjacent to the stem 420 that provides a profile with a vent lobe 424 that can engage with and open a vent valve 328 thereby exposing the regulated port 312 to vent (vent port out of frame). Offset from circumferentially on the cam 422 (by about 90 degrees in both directions as shown) is a pair of supply cams 441. The supply cams 441 may each engage with and open a pair of supply valves 340. A medial portion 423 of the cam 422 allows the vent valve 328 and both supply valves 340 to remain closed. The vent cam 424 and the supply cams 441 are on opposite ends (axially) of the cam 422. Slots or channels may be provided in the cam 422 to receive and guide balls associated with the valves 328, 340.

The vent valve 328 and the supply valves 340 may be substantially similar or identical in construction to those described with respect to the regulator 300. Additionally, although both regulators 300, 400 are shown with one vent valve 328 and two supply valves, 340, other embodiments can differ in number and placement of valves.

Regulated pressure is controlled at least in part by pilot pressure and spring tension from the spring 404. In the event that regulated pressure becomes high and exceeds the setpoint, the piston 410 may be pushed against the spring and the hydraulic pilot pressure (moved leftward as shown). In this case, the vent cam 424 will open the closed-biased vent valve 328 which exposed regulated pressure to vent, thereby reducing the regulated pressure and allowing the control piston to move back such that the cam 424 moves away from the vent valve 328 closing it again.

In the event that regulated pressure drops, the spring 404 and pilot pressure moves the control piston away from the direction of the spring and the cams 441 open the closed-biased supply pressure valves 340, thereby exposing the regulated pressure to supply pressure. Supply pressure may increase the regulated pressure which will move the piston back (leftward as shown) against the spring 404 and pilot pressure, which will close the supply pressure valves 340 again.

The ramped profiles of the cams 424, 441 open and close the associated valves in a linear and controlled manner. To further control and/or dampen movement of the control piston 410, pilot pressure may enter the regulator 400 via a check valve 432 with a bypass orifice in the channel 430. The check valve 432 may comprise a ball check valve. In such case check valve 432 may have a seat 434 defining one or more slots acting as an orifice. The associated ball, when seated against the seat 434, substantially slows, but does not stop, fluid flow. In this manner pilot pressure may always be increased if needed and the piston 410 is not hydraulically locked. However, in the event that regulated pressure drops it may need to be restored quickly. To that end the check valve 432 is forced open by the displacement of fluid by the control piston 410 and the control piston 410 is not substantially impeded by back pressure in the channel 430.

The design of regulators according to the present disclosure provide smooth and accurate setting of a regulated pressure. The linear motion of control pistons and the associated linear camming actions, as well as the distances the pistons of the various embodiments travel between valve openings creates a very damped valve. With high dampening comes stability. Regulators according to the present disclosure work well with pressure spikes, multiple regulators in series, high flow events, and low flow events.

Figure 5:
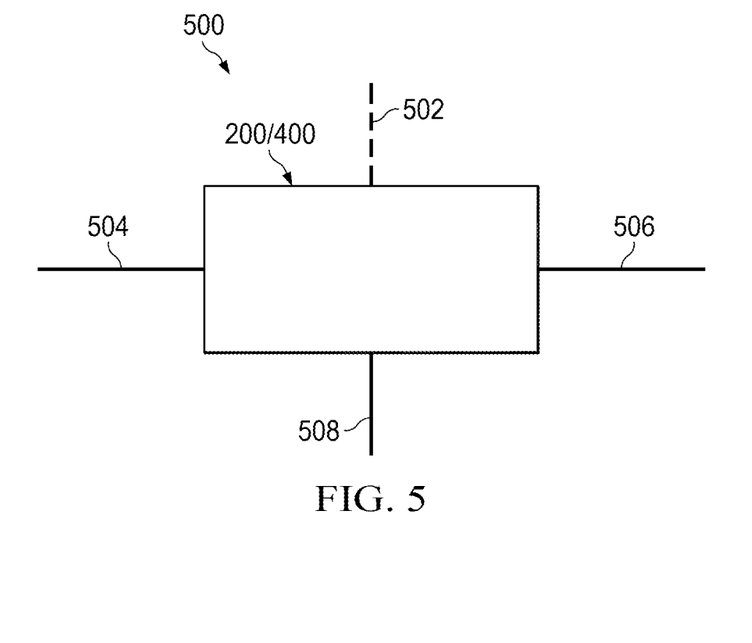
FIG. 5 is a simplified schematic of a hydraulic circuit incorporating a hydraulically set regulator according to the present disclosure.
Figure 6:
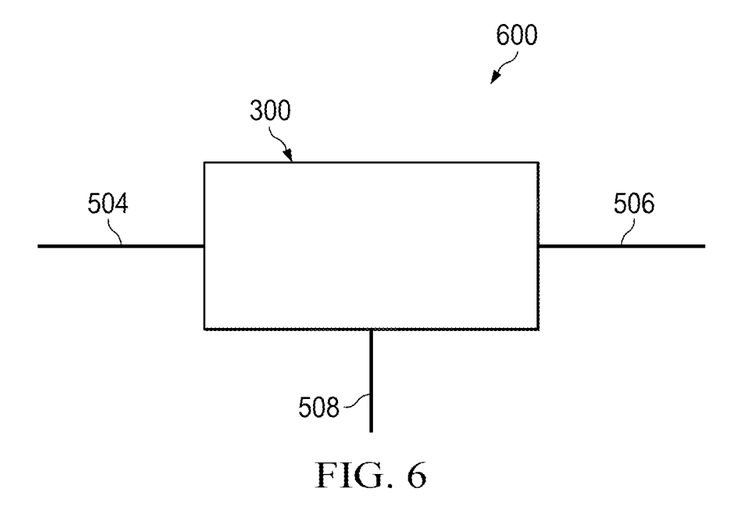
FIG. 6 is a simplified schematic of a hydraulic circuit incorporating a manually set regulator according to the present disclosure.

The present disclosure is not intended to be limited with respect to applications of the disclosed high stability regulators. FIG. 5 illustrates that, in a very simple example, a hydraulically controlled regulator (such as regulators 200/400) have a supply port 504 that is regulated as described above to produce a predictable and stable pressure at a regulator port 506. A vent port 508 may be utilize as described. Control of the regulator 200/400 may be via a pilot port 502 as described. As show in FIG. 6, in the case of a manually set regulator (e.g., regulator 300), supply pressure port 504 is regulated to supply stable and predictable pressures at regulated port 508. Vent port 508 may also be used but pilot port 502 may be absent or unused.

It should be appreciated that not every machining operation, flow path, seal, gasket, fastener, or other component that would be needed to implement regulators as described herein is described in detail. Such components and expertise is known in the art, and thus embodiments of the present disclosure can readily be implemented without undue experimentation based on the components and functionality described.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A hydraulic regulator comprising:
   a vent valve that opens to provide a fluid path from a regulated pressure port to a vent port;
   a supply valve that opens to provide a fluid path from the regulated pressure port to a supply pressure port; and
   a control piston having a linear cam profile with a vent cam that opens the vent valve and a supply cam that opens the supply pressure valve;
   wherein the vent cam and the supply cam are spaced apart axially along the control piston and the vent valve and the supply pressure valve are spaced apart from one another such that only one of the vent valve and the supply valve are opened at once;
   wherein the control piston moves in a first direction to open the vent valve and in a second, opposite direction to open the supply valve and
   wherein the control piston is exposed on a first end thereof to the regulated pressure port such that the piston moves in the first direction when a regulated pressure exceeds a predetermined limit.

2. The hydraulic regulator of claim 1, wherein the control piston is exposed on a second, opposite end thereof, to a set spring.

3. The hydraulic regulator of claim 2, wherein the control piston moves in the second direction when the regulated pressure on the first end exceeds a force of the set spring on the second end of the piston.

4. The hydraulic regulator of claim 1, wherein the control piston is exposed on a second, opposite end thereof, to a hydraulic pilot pressure.

5. The hydraulic regulator of claim 4, wherein the control piston moves in the second direction when the regulated pressure on the first end exceeds a force of the pilot pressure on the second end of the piston.

6. The hydraulic regulator of claim 5, wherein a fluid pathway between the control piston and the pilot pressure is damped by a check valve with an orifice.

7. The hydraulic regulator of claim 1, wherein the control piston is exposed on a second, opposite end thereof to a spring and a hydraulic pilot pressure.

8. The hydraulic regulator of claim 7, wherein the control piston moves in the second direction when the regulated pressure on the first end exceeds a force of the pilot pressure and a force of the spring on the second end of the piston.

9. A hydraulic regulator comprising:
   a pilot piston with an outer cam profile including a vent lobe at a first end of the cam profile and a first supply lobe on a distal second end of the cam profile, the vent lobe and the first supply lobe extending radially away from a flat medial portion of the cam profile;
   a first ball actuating a vent valve upon contact with the vent lobe; and
   a second ball actuating a first supply valve upon contact with the first supply lobe;
   wherein the piston is biased to respond to a regulated pressure at a regulated port by moving axially first direction to bring the first ball in contact with the vent lobe when the regulated pressure exceeds a setpoint, and to respond to the regulated port pressure by moving axially in a second direction to bring the second ball in contact with the first supply lobe when the regulated pressure falls below the setpoint;
   wherein opening of the vent valve exposes the regulated port to vent, and opening of the first supply valve exposes the regulated port to a supply pressure; and
   wherein the outer cam profile is configured such that the vent valve and the first supply valve cannot open simultaneously.

10. The hydraulic regulator of claim 9, wherein the vent lobe and the first supply lobe are offset from one another circumferentially on the outer cam profile.

11. The hydraulic regulator of claim 9, further comprising a third ball actuating second supply valve upon contact with second supply lobe on the control piston.

12. The hydraulic regulator of claim 11, wherein the second supply lobe is on the second distal end of the cam profile.

13. The hydraulic regulator of claim 12, wherein the first and second supply lobes are offset circumferentially about 180 degrees from one another on the cam profile.

14. The hydraulic actuator of claim 9, wherein the control piston is biased hydraulically.

15. The hydraulic actuator of claim 14, further comprising a guide having an internal channel and fitted inside the outer cam profile, the internal channel providing the hydraulic bias of the control piston.

16. The actuator of claim 14, further comprising a channel passing axially through the control piston and providing the hydraulic bias to the control piston on a first end thereof opposite a second end exposed to the regulated pressure.

17. A hydraulic actuator comprising:
- a supply port, a vent port, and a regulated port;
- a supply valve biased in a closed position, that provides a fluid connection from the supply port to the regulated port when in an open position;
- a vent valve biased in a closed position that provides a fluid connection from the vent port to the regulated port when in an open position; and
- a control piston having a first end and a second end with a linear cam profile between the first end and the second end, the outer cam profile having a narrower medial portion, a vent lobe on a first end, and a supply lobe on a second end;
- wherein a first end of the control piston receives a biasing force and the second end of the piston is exposed to the regulated port;
- wherein the control piston moves the vent lobe into contact with the vent valve thereby opening it when a pressure at the regulated port exceeds a set point;
- wherein the control piston moves the supply lobe into contact with the supply valve thereby opening it when the pressure at the regulated port falls below the set point; and
- wherein the supply valve and the vent valve are spaced with respect to the linear cam profile such that only one of the supply valve and the vent valve can be opened at once, but both the supply valve and the vent valve may be closed simultaneously.

18. The hydraulic actuator of claim 17, wherein the control piston is spring biased on the first end thereof and receives a guide in a chamber in the second end thereof, the guide having an internal channel that with a fluid pathway to the regulated port.

* * * * *